United States Patent
Garner et al.

(10) Patent No.: US 12,472,571 B2
(45) Date of Patent: Nov. 18, 2025

(54) AUTOMATED ITERATIVE ELECTRODE FABRICATION FOR PULSED ELECTROCHEMICAL MACHINING

(71) Applicant: Rolls-Royce Corporation, Indianapolis, IN (US)

(72) Inventors: Rusty M. Garner, Indianapolis, IN (US); Damon Ward, Indianapolis, IN (US); Monica Sy Munoz, Indianapolis, IN (US); Christopher Owen Nash, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 874 days.

(21) Appl. No.: 17/661,483

(22) Filed: Apr. 29, 2022

(65) Prior Publication Data
US 2023/0347430 A1    Nov. 2, 2023

(51) Int. Cl.
*B23H 3/02* (2006.01)
*B23H 3/04* (2006.01)
*B23H 7/20* (2006.01)

(52) U.S. Cl.
CPC ............... *B23H 3/02* (2013.01); *B23H 3/04* (2013.01); *B23H 2300/10* (2013.01)

(58) Field of Classification Search
CPC ........ B23H 3/02; B23H 3/04; B23H 2300/10; B23H 7/20
USPC ............................................................ 700/119
See application file for complete search history.

(56) References Cited

U.S. PATENT DOCUMENTS

| | | | |
|---|---|---|---|
| 2013/0204124 A1* | 8/2013 | Duindam | A61B 17/3468 604/272 |
| 2020/0198038 A1* | 6/2020 | Chapatte | B23H 7/18 |

* cited by examiner

*Primary Examiner* — Michael J Brown
(74) *Attorney, Agent, or Firm* — Shumaker & Sieffert, P.A.

(57) ABSTRACT

The disclosure describes a method for defining an electrode of a pulsed electrochemical machining (pECM) tool that is performed by one or more processors. The method includes receiving workpiece measurement data representative of a machined surface of a machined workpiece. The machined workpiece has been machined by a working surface of an initial electrode. The method includes identifying a set of dimensional differences between the workpiece measurement data and workpiece model data representative of a finished surface of a master workpiece. The method includes updating, based on the set of dimensional differences, initial electrode model data representative of the working surface of the initial electrode and outputting the updated electrode model data.

18 Claims, 6 Drawing Sheets

AUTOMATED ITERATIVE ELECTRODE FABRICATION FOR PULSED ELECTROCHEMICAL MACHINING

TECHNICAL FIELD

The disclosure relates to pulsed electrochemical machining (pECM).

BACKGROUND

Machining processes may involve removal of material from a workpiece to form a component having a finished shape and texture. Pulsed electrochemical machining (pECM) is a non-contact machining process based on the principles of electrolysis. Pulsed electrochemical machining may also be referred to as precision electrochemical machining or pulse electrochemical machining. A pECM system may include a tool (the cathode) that imparts its shape into a workpiece (the anode) in a mirror image. As the tool moves toward a surface of the workpiece to be machined, a pulsed DC current may be applied to the tool and the workpiece. The tool maintains a tiny interelectrode gap (e.g., of less than about 10 microns) from the surface of the workpiece, and the workpiece dissolves anodically about the tool, taking on the complementary shape of the tool. An electrolyte pumped between the tool and the workpiece may remove dissolved metal from the workpiece and heat.

Since the cathodic tool does not physically contact the anodic workpiece, pECM can produce burr-free three-dimensional shapes with little or no tool wear. pECM may be used to machine any conductive metal or alloy, and is particularly well suited for materials, such as superalloys, that are difficult to machine through conventional methods. Materials commonly machined with pECM include, for example, nickel, iron, and titanium-based alloys in a variety of formats such as cast (including single crystal), forged, additively manufactured, and powdered metallurgy.

SUMMARY

The disclosure generally describes systems and techniques for defining a working surface of an electrode of a pECM tool. An initial iteration of an electrode may have a working surface that roughly corresponds to a finished surface of a master workpiece, with accommodation made for an interelectrode gap. The initial electrode may be used to machine a workpiece, and measurement data from machined surface of the machined workpiece may be collected and compared against workpiece model data of the finished surface of the master workpiece. The electrode model data that is used to fabricate the initial electrode may be adjusted to account for any differences between the machined surface of the machined workpiece and the workpiece model data of the finished surface of the master workpiece. The adjusted electrode model data may represent an electrode having a shape that produces a machined surface that is closer to the finished surface than the shape of the initial electrode. If desired, the process may be further iterated for a refined electrode produced from the adjusted electrode model data until an electrode capable of producing a machined workpiece within a desired tolerance is produced. In this way, a working surface of an electrode of a pECM tool may be refined automatically and/or with fewer iterations compared to a working surface of an electrode that is manually refined or refined based on difficult-to-model simulations.

In some examples, the disclosure describes a method, performed by one or more processors, for defining a pulsed electrochemical machining (pECM) tool that includes receiving workpiece measurement data representative of a machined surface of a machined workpiece, in which the machined workpiece has been machined by a working surface of an initial electrode. The method includes identifying a set of dimensional differences between the workpiece measurement data and workpiece model data representative of a finished surface of a master workpiece, updating, based on the set of dimensional differences, initial electrode model data representative of the working surface of the initial electrode, and outputting the updated electrode model data.

In some examples, the disclosure describes device for defining a pulsed electrochemical machining (pECM) tool that includes a memory and one or more processors. The memory is configured to store workpiece model data representative of a finished surface of a master workpiece and initial electrode model data representative of a working surface of an initial electrode. The one or more processors are configured to receive workpiece measurement data representative of a machined surface of a machined workpiece, in which the machined workpiece has been machined by the working surface of the initial electrode. The one or more processors are further configured to identify a set of dimensional differences between the workpiece measurement data and the workpiece model data, update, based on the set of dimensional differences, the initial electrode model data, and output the updated electrode model data.

In some examples, the disclosure describes a system for refining a pulsed electrochemical machining (pECM) tool that includes an imaging device and a computing device that includes one or more processors. The imaging device is configured to capture image data representative of a machined workpiece. The one or more processors are configured to determine, based on the image data, workpiece measurement data representative of a machined surface of the machined workpiece, in which the machined workpiece has been machined by a working surface of an initial electrode. The one or more processors are further configured to identify a set of dimensional differences between the workpiece measurement data and workpiece model data representative of a finished surface of a master workpiece, update, based on the set of dimensional differences, initial electrode model data representative of the working surface of the initial electrode, and output the updated electrode model data.

The details of one or more examples are set forth in the accompanying drawings and the description below. Other features, objects, and advantages will be apparent from the description and drawings, and from the claims.

DETAILED DESCRIPTION

Figure 1A:
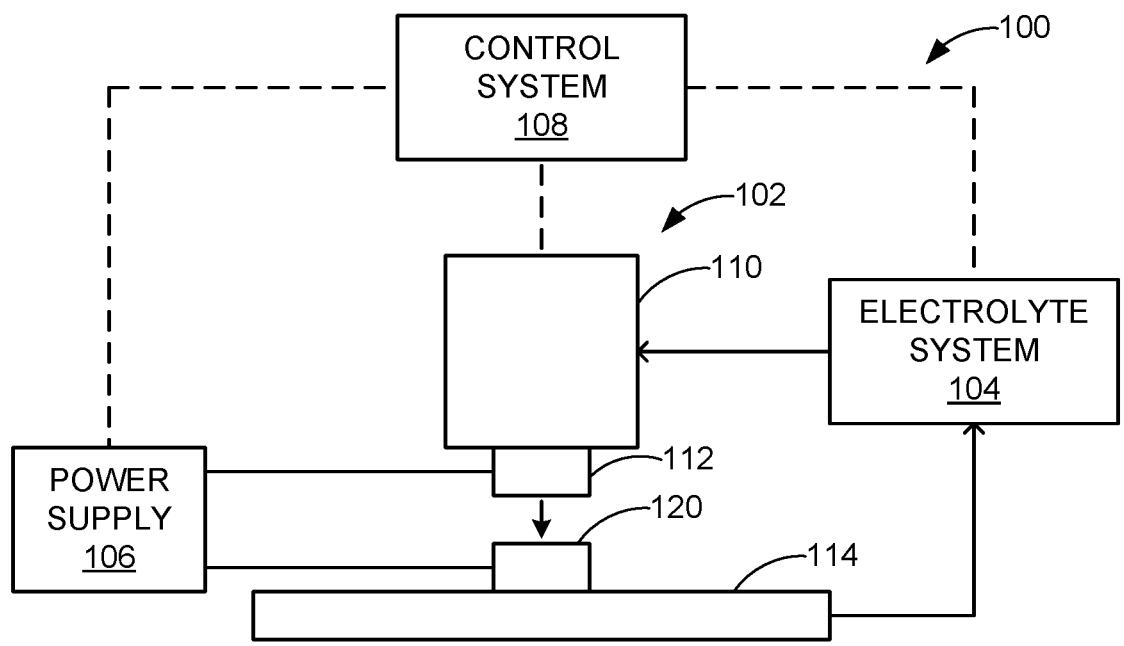
FIG. 1A is a conceptual block diagram illustrating a pulsed electrochemical machining (pECM) system.

The disclosure generally describes systems and techniques for defining a working surface of an electrode of a pulsed electrochemical machining (pECM) tool. A working surface of an electrode (e.g., cathode) of a pECM tool may generally mirror a finished surface of a workpiece (e.g., anode). However, variables that control a pECM process, such as timing of pulses, frequency of pulses, and a distance between the cathode and the anode, may produce deviations in a rate of material removal from the workpiece that result in a finished surface of the workpiece that does not match the working surface of the electrode. To generate a workpiece that is within tolerance, the shape of the working surface of the electrode may be iteratively refined such that the electrode produces a finished surface of the workpiece that is within tolerance.

As one example, an electrode may machine a workpiece, and the machined workpiece may undergo an inspection process whereby three-dimensional (3D) measurement data of the machined workpiece is compared to a CAD model of the master workpiece to determine whether tolerances have been exceeded. Based on the results of the 3D measurement data, the electrode may be manually worked, such as by filing or shaving particular regions. This manual working process may difficult to replicate, highly imprecise, and can only be achieved by removing material. As another example, rather than manually work the electrode, the shape of the electrode in the CAD model may be manually adjusted and a new electrode with the manual adjustments may be fabricated and used to machine a new workpiece. This adjustment process may require extensive time to complete, and may require multiple iterations and delay production of the machined workpieces. As another example, a pECM process may be simulated to determine any projected differences in a working surface of an electrode and a finished surface of the workpiece. However, such simulation may be extremely complex due to the various flow, electrical, and movement characteristics at the cathode and anode interface, and may produce an electrode model that is inaccurate for the relatively small tolerances required for the machined workpiece.

In the present disclosure, electrode model data representative of an electrode of a pECM tool is automatically updated based on measured differences between a workpiece machined by the electrode and a master workpiece. An initial electrode may include a working surface that generally corresponds to a finished surface of a master workpiece. The initial electrode may machine a workpiece, and a coordinate measurement device may generate measurement data, such as a point cloud, for the machined workpiece. A computing device may compare the workpiece measurement data with model data for the master workpiece to identify any dimensional differences between the machined surface of the machined workpiece and the finished surface of the master workpiece. For example, the dimensional differences may be characterized by vectors representing a direction and magnitude of deviation of data points of the point cloud representing the machined workpiece to corresponding data points of a point cloud representing the master workpiece.

The computing device may further update model data for the initial electrode based on the dimensional differences between the machined surface and the finished surface. For example, data points of a point cloud representing the initial electrode may be adjusted in an opposite direction of the vectors, such that the updated electrode model data accounts for the dimensional differences between the machined and finished surfaces. The computing device may output the updated electrode model data for use in fabricating a refined electrode having a working surface configured to produce a machined surface of a workpiece that is closer to the finished surface of the master workpiece. The electrode model data may be further refined based on measurement data from a workpiece machined by the continually refined electrode until a dimensional tolerance of the machined workpiece is met. In this way, the working surface of an electrode of a pECM tool may be quickly and automatically refined.

Machining tools described herein may be used as part of a pulsed electrochemical machining (pECM) system. For example, a pECM process may involve relatively small tolerance and dynamic conditions that may be difficult to simulate and electrodes having complex surfaces that are expensive and/or time-consuming to fabricate using manual methods. FIG. 1A is a schematic conceptual block diagram illustrating an example pECM system 100 for machining a workpiece 120. pECM system 100 includes a mechanical system 102, an electrolyte system 104, a power supply 106, and a control system 108. While illustrated as separate components, the various components of pECM system 100 may be integrated with other components (e.g., power supply 106 incorporated into mechanical system 102) or overlap with other components (e.g., controllers of mechanical system 102 overlapping with control system 108). While examples of the disclosure are described primarily with regard to pulsed electrochemical machining processes performed by pECM system 100, other examples of the disclosure may be employed using other machining techniques that employ electrochemical machining to shape or otherwise selectively remove material from a workpiece.

Mechanical system 102 may include an actuation system 110, a machining tool 112, and an enclosure system 114. Actuation system 110 may be configured to control a position of machining tool 112 relative to workpiece 120. During a pECM process, actuation system 110 may adjust the position of tool 112 relative to workpiece 120 as needed by moving tool 112, workpiece 120, or both. Actuation system 110 may include one or more actuators, such as direct drive actuators, configured to move tool 112 and/or workpiece 120 as desired during a pECM process. For examples, one or more actuators may be configured to feed or otherwise move machining tool 112 toward workpiece 120 during a pECM process. In some examples, actuation system 110 may be configured to oscillate machining tool 112 (e.g., along the z-axis shown in FIGS. 1B and 1C). Such movement of tool 112 by actuation system may improve removal of dissolved material and restore a concentration of electrolyte between machining tool 112 and workpiece 120. As illustrated in the example of FIG. 1A, mechanical system 102 may be configured to receive electrolyte from electrolyte system 104 and discharge the electrolyte to or proximate to machining tool 112.

Machining tool 112 may be configured to mechanically couple to actuation system 110 and electrically couple to power supply 106. For example, machining tool 112 may include one or more structures or assemblies to couple to actuation system 110, such that machining tool 112 receives a control force for positioning machining tool 112, electrolyte (if distributed via mechanical system 102) for discharging from machining tool 112, and electrical current for generating an electric potential between machining tool 112 and workpiece 120. As will be described further in FIGS. 1B and 1C below, machining tool 112 may be configured to define a working surface that, in combination with workpiece 120 and the electrolyte supplied by electrolyte system 104, forms an electrolytic cell that dissolves material from the outer surface of workpiece 120 using electrolysis.

Enclosure system 114 may be configured to mount workpiece 120 and electrically couple workpiece 120 to power supply 106 for generating a voltage between machining tool 112 and workpiece 120 (e.g., in the form of a pulsed direct current). For example, enclosure system 114 may position workpiece 120 toward machining tool 112, such that a working surface of workpiece 120 is exposed to a working surface of machining tool 112. In some examples, enclosure system 114 may capture spent electrolyte from workpiece 120 for return to electrolyte system 104.

Electrolyte system 104 may be configured to condition and circulate electrolyte (e.g., liquid electrolyte) for distribution to a working surface of machining tool 112, such as via mechanical system 102. Electrolyte system 104 may include one or more pumps configured to discharge the electrolyte to mechanical system 102, one or more filters configured to filter contaminants from the electrolyte (e.g., for the re-use of electrolyte in the pECM process), one or more heat exchangers configured to remove heat from the electrolyte, and/or other components configured to maintain various parameters of the electrolyte.

Power supply 106 may be configured to generate an electric potential between machining tool 112 and workpiece 120. For example, power supply 106 may be configured to apply a voltage between machining tool 112 and workpiece 120 to generate current flow between machining tool 112 and workpiece 120 with the electrolyte flowing or otherwise present between machining tool 112 and workpiece 120. For a pulse EMC process, power supply 106 may be configured to supply voltage in pulses, such as in combination with oscillations of machining tool 112 relative workpiece 120, to increase local current density. For example, power supply 106 may include a direct current (DC) source that applies a pulsed direct current to both machining tool 112 and workpiece 120 during the pulse electrochemical machining process. In some examples, actuation system 110 may oscillate the position of machining tool 112 relative workpiece 120 in coordination with the pulsed direct current.

Control system 108 may be communicatively coupled to mechanical system 102, electrolyte system 104, and power supply 106, and configured to send control signals to mechanical system 102, electrolyte system 104, and power supply 106. For example, the control signals may cause mechanical system 102 to control (e.g., dynamically) a position of machining tool 112 relative to workpiece 120, cause electrolyte system 104 to supply electrolyte between machining tool 112 and workpiece 120, and cause power supply 106 to generate an electric potential between machining tool 112 and workpiece 120. Further operation of control system 108 will be described in FIG. 1D below.

Figure 1B:
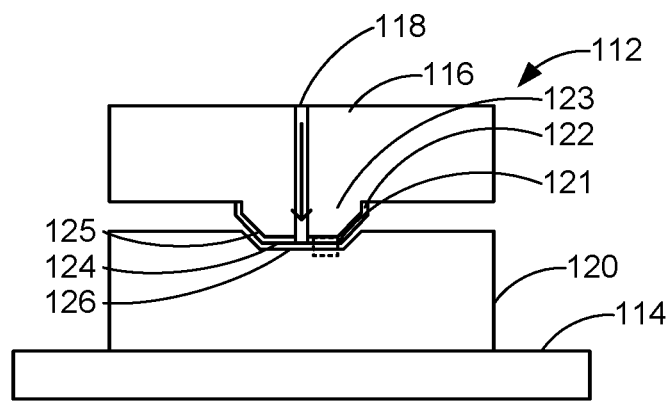
FIG. 1B is a side view cross-sectional conceptual diagram illustrating operation of a pECM tool of the pECM system of FIG. 1A.

Machining tool 112 defines a working surface that forms workpiece 120 into a component having a particular shape or set of dimensions (e.g., approximately the complimentary shape of machining tool 112). FIG. 1B is a side view cross-sectional conceptual diagram illustrating operation of machining tool 112 of pECM system 100 of FIG. 1A. Machining tool 112 includes a tool body 116 defining a tool axis that aligns with an axis of actuation system 110 of FIG. 1A. Tool body 116 includes one or more electrodes 122 (one or more cathodes). While illustrated in FIG. 1B as including a single electrode 122, tool body 116 may include multiple electrodes 122. While the term electrode is used herein for the machining tool, an electrode generally defines a cathode during a pECM process and may be referred to as such. However, in some cases, a pECM process may include reversing the polarity of a pulse such that the tool electrode functions (e.g., periodically) as the anode with the workpiece being the cathode.

Each electrode 122 defines a working surface 124 at a distal end of the tool axis. When machining tool 112 is attached to actuation system 110, each working surface 124 is configured to face a corresponding target surface 126 of workpiece 120. In some examples, such as illustrated in FIG. 1B, tool body 116 may include an electrolyte channel 118 configured to receive an electrolyte from electrolyte system 104 (e.g., via mechanical system 102) and discharge the electrolyte through one or more openings near working surface 124 of electrode 122.

Each electrode 122 includes an electrically conductive material at working surface 124. An electrically conductive material may include any material having an electrical conductivity greater than about $1 \times 10^6$ S/m. Likewise, workpiece 120 may be an electrically conductive material. When an electric potential (e.g., in the form of a pulse direct current) is generated between working surface 124 of electrode 122 and target surface 126 of workpiece 120 (e.g., with power supply under the control of control system 108), working surface 124 may form a cathode surface and target surface 126 may form an anode surface. As working surface 124 is advanced and material from workpiece 120 is removed, a shape of target surface 126 may generally correspond to the complimentary shape of working surface 124. While the shape of workpiece 120 is shown to mirror the shape of electrode 122 in FIG. 1B, in other examples, the dimensions and shape formed in workpiece 120 from the removal of material from workpiece 120 do not exactly mirror the shape of the tool 112.

The conductive materials of electrode(s) 122 and workpiece 120 may be any suitable conductive material such as metal, metal alloy, or ceramic material. Examples of metals that may be used to form the workpiece 120 and the electrode(s) 122 of tool 112 include nickel, iron, and titanium-based alloys in a variety of formats such as cast (including single crystal), forged, additively manufactured, and powdered metallurgy. Examples of suitable metals and metal alloys for the workpiece 120 and electrode(s) 122 of tool 112 include, but are not limited to, any superalloy such as CMSX-4, MarM247, Haynes 230, Rene N-5, MP35N, and the like, steels such as 4140, A2 tool steel, M4 tool steel, and gear steels such as Ferrium C64, Al 6061, Al 7075, brass, bronze, CoCr, Cu, Ge, Inconels such as 625, 718, and 740h, Mo, Ni, Nitinol, Nitronic 60, Pyrowear 53, stainless steels such as 17-4, 304, 316, and 440C, Ti Grade 1-5, Ti 64, TiAl, and mixtures and combinations thereof.

pECM system 100 may be particularly suited for machining relatively hard superalloys as workpiece 120, including nickel superalloys such as CMSX-4. In some examples, the nickel superalloy may have a composition including Chromium (e.g., about 5.5 wt % to about 7.5 wt %), Cobalt (e.g., about 9 wt % to about 11 wt %), Molybdenum (e.g., about 0.3 wt % to about 0.9 wt %), Tungsten (e.g., about 5 wt % to about 7 wt %) e.g., with the balance being nickel. In some examples, such a nickel superalloy may also include Titanium (e.g., about 0.5 wt % to about 1.5 wt %), Titanium (e.g., about 0.5 wt % to about 1.5 wt %), Hafnium (e.g., about 0 wt % to about 0.2 wt %), Tantalum (e.g., about 5.5 wt % to about 6.5 wt %), Tantalum (e.g., about 5.5 wt % to about 6.5 wt %), Rhenium (e.g., about 2 wt % to about 4 wt %), and/or Rhenium (e.g., about 2 wt % to about 4 wt %) in trace amounts.

Figure 1C:
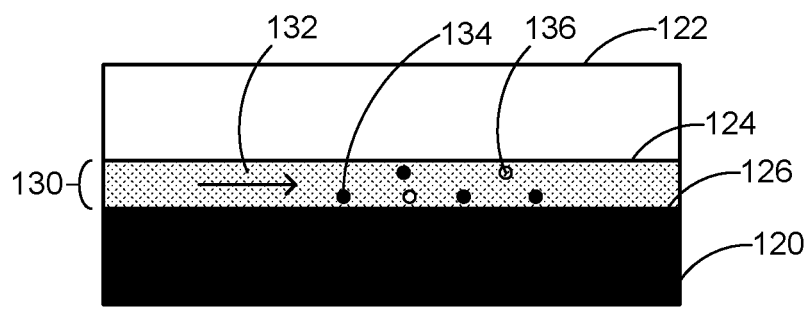
FIG. 1C is a side view cross-sectional conceptual diagram illustrating a magnified view of a portion of FIG. 1B.

FIG. 1C is a side view cross-sectional conceptual diagram showing a magnified view within window 121 indicated in FIG. 1B to illustrate operating principles of the pECM tool of FIG. 1B. Working surface 124 of electrode 122 is positioned relative to target surface 126 of workpiece 120 to form an interelectrode gap 130, and an electrolyte 132 flows through interelectrode gap 130. When an electric potential (e.g., in the form of a pulse direct current) is generated between working surface 124 and target surface 126, current flows from working surface 124 to target surface 126 via electrolyte 132 to form an electrolytic cell. The current dissolves material at target surface 126 to generate electrochemical reaction products that include dissolved material 134, hydrogen gas 136, and heat. Electrolyte 132 carries away the electrochemical reaction products from interelectrode gap 130. In general, material removal rate may be related to current density in interelectrode gap 130. The current density in interelectrode gap 130 may be related to a variety of parameters including, but not limited to: spatial parameters, such as a distance of interelectrode gap 130; electrical parameters, such as an electric potential across interelectrode gap 130; electrolyte parameters, such as a flow rate of electrolyte 132; and other parameters that may affect flow of current from working surface 124 to target surface 126.

Figure 1D:
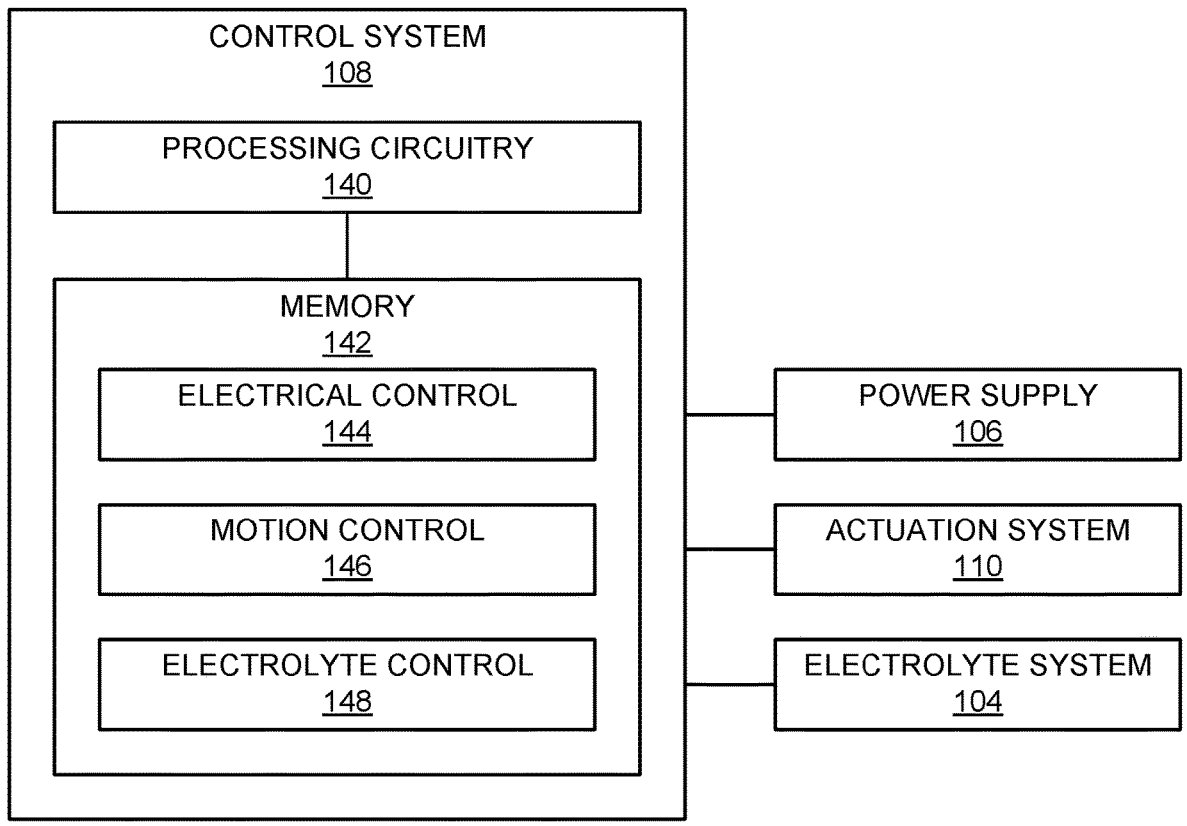
FIG. 1D is a conceptual block diagram illustrating an example control system of the pECM system of FIG. 1A.

FIG. 1D is a conceptual block diagram illustrating an example control system 108 of pECM system 100 of FIG. 1A. Control system 108 includes processing circuitry 140 and a memory 142. Memory 142 includes computer-readable instructions that, when executed by processing circuitry 140, causes processing circuitry 140 to perform various functions related to control of components of pECM system 100. Processing circuitry 140 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processing circuitry 140 herein may be embodied as software, firmware, hardware or any combination thereof. Memory 142 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Memory 142 may store any suitable information, including information for executing one or more electrochemical machining processes with which pECM system 100 performs on workpiece 120. For example, memory 142 may store one or more of electrical control instructions 144, motion control instructions 146, and electrolyte control instruction 148 in separate memories within memory 142 or separate areas within memory 142. Electrical control 144, motion control 146, and electrolyte control 148 may, in combination, define parameters that control pECM system 100 to remove material from workpiece 120 to generate a component having particular dimensions. In some examples, workpiece 120 may be a partially fabricated component having relatively rough dimensions, such that the pECM process may further refine workpiece 120 to relatively fine dimensions.

Electrical control 144 may define values for electrical parameters of a pECM process including, but not limited to, voltage amplitude applied to electrode 122 and workpiece 120, frequency of electric current, duty cycle (e.g., pulse length), current amplitude, and other electric parameters associated with control of current across interelectrode gap 130. Processing circuitry 140 may generate and send control signals that include the electrical parameters to electrical control circuitry of power supply 106.

Motion control 146 may define values for motion parameters of a pECM process including, but not limited to, feed rate of machining tool 112, position of machining tool 112 (e.g., depth limit of machining tool 112), frequency of oscillation of machining tool 112, amplitude of oscillation of machining tool 112, length of interelectrode gap 130, and other motion parameters associated with control of relative and/or time-varying position of working surface 124. Processing circuitry 140 may generate and send control signals that include the motion parameters to actuation circuitry of actuation system 110.

Electrolyte control 148 may define values for electrolyte parameters of a pECM process including, but not limited to, flow rate of electrolyte 132 through interelectrode gap 130, temperature of electrolyte 132, and other electrolyte parameters associated with conditions of electrolyte 132 in interelectrode gap 130. Processing circuitry 140 may generate and send control signals that include the electrolyte parameters to electrolyte control circuitry of electrolyte system 104.

Figure 1E:
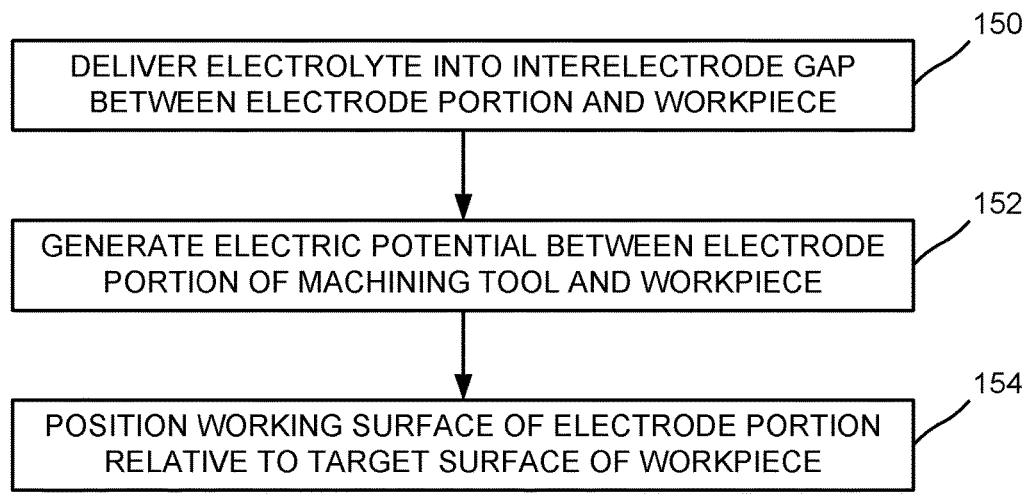
FIG. 1E is a flow diagram illustrating an example technique for controlling the pECM system of FIG. 1A.

FIG. 1E is a flow diagram illustrating an example technique for controlling pECM system 100 of FIG. 1A. While illustrated sequentially, the various steps of FIG. 1E may be initiated in a different order (or sequentially) to remove material from workpiece 120. Control system 108 may cause electrolyte system 104 to deliver electrolyte 132 into interelectrode gap 130 between working surface 124 of electrode 122 and target surface 126 of workpiece 120 (150) and cause power supply 106 to generate an electric potential between electrode 122 and workpiece 120 (152) to form an electrolytic cell. Control system 108 may cause actuation system 110 to position working surface 124 of electrode 122 relative to target surface 126 of workpiece 120 (154) to control the size of interelectrode gap 130 and advance working surface 124 toward target surface 126 as material is removed from workpiece 120. In some examples, interelectrode gap 130 may be on the order of about 10 microns although other values are contemplated.

As illustrated in FIG. 1C, a variety of different pECM process parameters may affect material removal rate of workpiece 120 at target surface 126. While FIG. 1C is illustrated as having working surface 124 mirror target surface 126, spatial variations in the process parameters may cause target surface 126 to have a different surface geometry than working surface 124. As such, during fabrication of electrode(s) 122, working surface 124 may be designed to create target surface 126 at the particular pECM process parameters. Predicting how the particular pECM process parameters may affect target surface 126 may be difficult, as various chemical and electrical phenomena interact to affect material removal rate of workpiece 120.

At best, simulation may provide a starting point for iteratively fabricating workpiece 120 and refining working surface 124 of electrodes 122($s$). However, iteratively fabricating workpiece 120 based on working surface 124 and refining working surface 124 may involve time-consuming manual effort that leads to a large number of iterations. For example, target surface 126 may be compared to a finished surface of a nominal workpiece, and a model representing electrode 122($s$) may be manually adjusted to attempt to create working surface 124 that produces a finished surface of workpiece 120 that matches the finished surface of the nominal workpiece.

Figure 2:
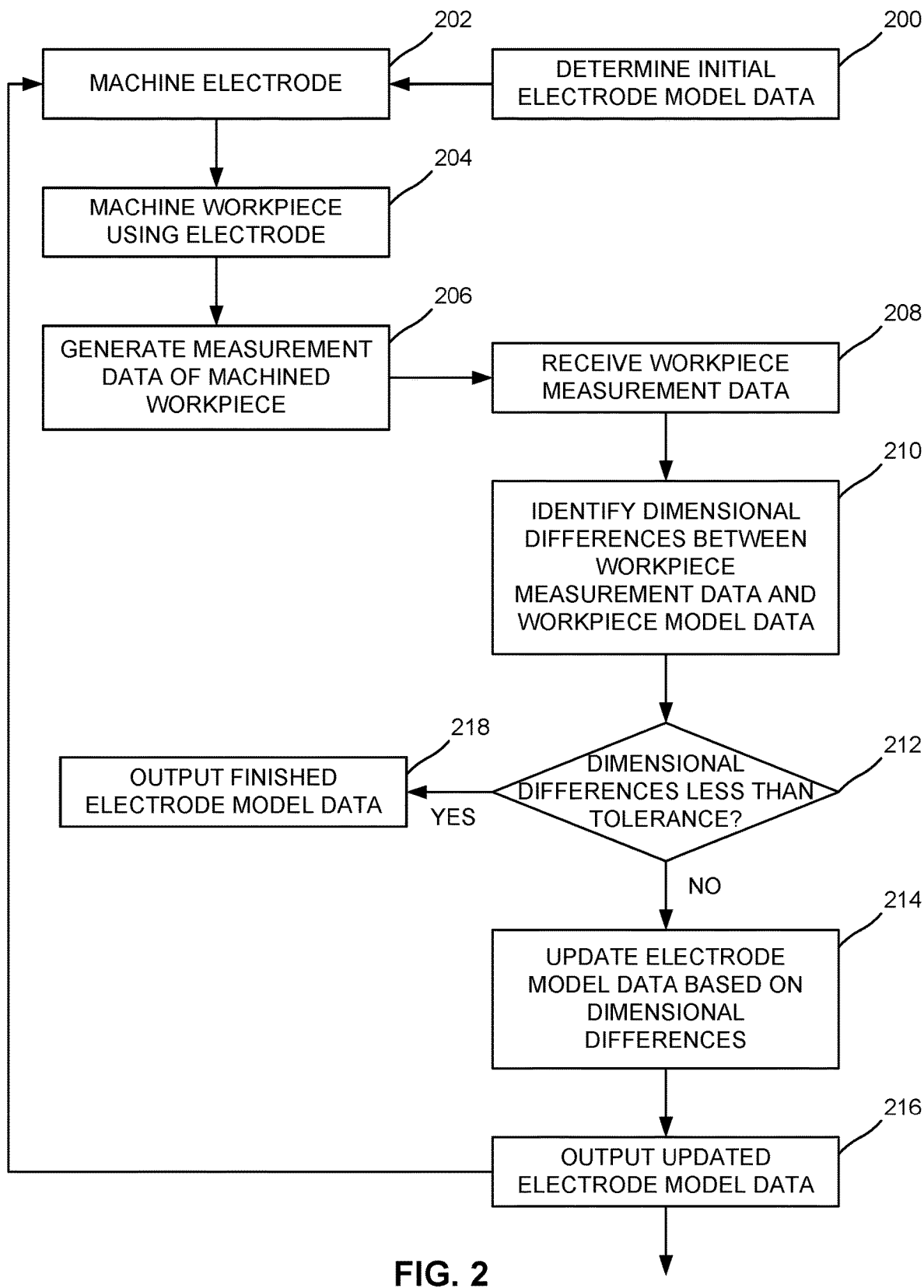
FIG. 2 is a flow diagram illustrating an example process for refining a working surface of an electrode of a pECM tool.

According to the principles of the disclosure, a working surface of an electrode may be defined by parameterizing differences between surfaces of machined and master workpieces using measurement data from the machined workpiece and updating electrode model data to account for these differences. FIG. 2 is a flow diagram illustrating an example process for refining a working surface of an electrode of a pECM tool. FIG. 2 will be described concurrently with respect to the examples of FIGS. 3A-3E.

Figure 3A:
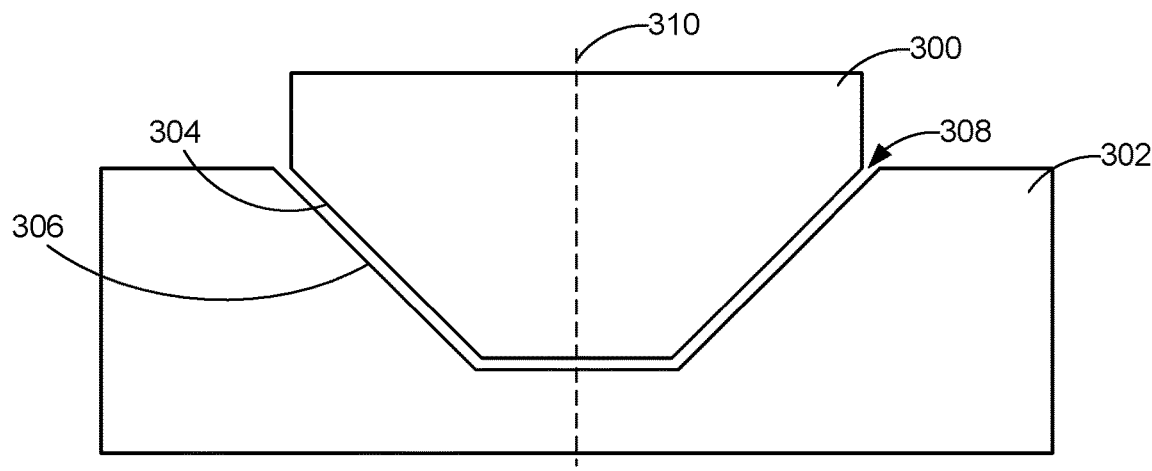
FIG. 3A is a side view cross-sectional conceptual diagram illustrating a pECM tool that includes an initial electrode and a master workpiece prior to refinement of the initial electrode.

A computing device may determine, based on workpiece model data and a predetermined gap, initial electrode model data (200). FIG. 3A is a side view cross-sectional conceptual diagram illustrating a pECM tool that includes an initial electrode 300 and a master workpiece 302 prior to refinement of initial electrode 300. Initial electrode 300 may be configured to advance along a z-axis 310, such that areas of slope of working surface 304 may create different local conditions of material removal rate. A working surface 304 of initial electrode 300 may be offset from a finished surface 306 of master workpiece 302 by a predetermined gap 308. The predetermined gap may be selected based on an anticipated interelectrode gap during a pECM process, and may partially account for parameters that may generally affect a size of the interelectrode gap during the pECM process, such as a slope of working surface 304. However, as explained above, predetermined gap may merely be a starting point, and is unlikely to account for all effects of pECM process parameters that result in a finished surface of a workpiece.

An electrode fabrication system may fabricate initial electrode 300 based on initial electrode model data (202). Initial electrode 300 may be designed in a computer-aided design (CAD) program or other modeling program, and the electrode fabrication system may fabricate initial electrode 300 based on this initial electrode model data. In some examples, the method may include generating, by a coordinate measurement device, electrode measurement data for initial electrode 300 to identify a surface geometry of working surface 304 of initial electrode 300 and account for any differences between the electrode measurement data and the initial electrode model data.

Figure 3B:
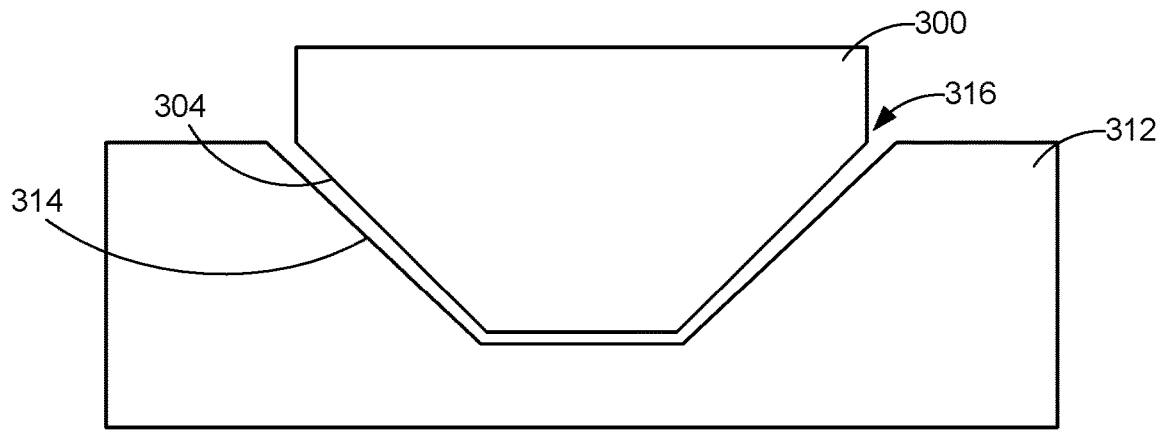
FIG. 3B is a side view cross-sectional conceptual diagram illustrating a pECM tool that includes an initial electrode and a machined workpiece prior to refinement of the initial electrode.

A pECM system may machine a workpiece using initial electrode 300 (204). FIG. 3B is a side view cross-sectional conceptual diagram illustrating a pECM tool that includes initial electrode 300 and a machined workpiece 312 prior to refinement of initial electrode 300. The pECM system may perform a pECM process using initial electrode 300 to form machined workpiece 312. This pECM process may include process parameters that would be used during intended fabrication of workpieces using an electrode, such that any effects of these operating parameters may be reflected in the resulting shape and surface geometry of machined workpiece 312. A machined surface 314 of machined workpiece 312 may be offset from working surface 304 of initial electrode 300 due to an interelectrode gap 316. Interelectrode gap 316 may be influenced by a variety of pECM process parameters. Due to spatial differences in material removal rate created by the operating parameters and a geometry of working surface 304, a machined surface 314 of workpiece 312 may not match working surface 304 of initial electrode 300. As one example, for workpieces with different areas of slope, areas of a higher slope may have a greater distance of interelectrode gap 316. For example, in side-gap machining, initial electrode 300 may descend downward along z-axis 310 to continue machining on sides of workpiece 312 as electrode 300 plunges further downward, leading to overmachining. In contrast, in frontal machining, a constant gap may be maintained as electrode 300 moves downwards in along z-axis 310. As another example, for electrodes having a radially outward distribution of electrolyte, such as illustrated in FIG. 1B, areas further from the electrolyte outlet may have a greater number of waste products and a lower electrical conductivity of the electrolyte, resulting in a lower material removal rate.

A coordinate measuring device may generate workpiece measurement data representative of a machined surface of a machined workpiece (206). A coordinate measuring device (or coordinate measuring machine, CCM), such as a laser, may be configured to determine precise measurement data for machined surface 314 of machined workpiece 312.

Figure 3C:
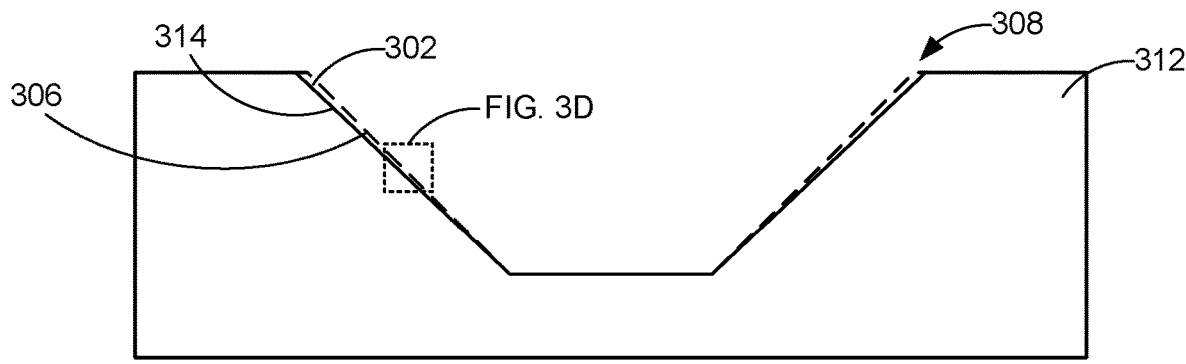
FIG. 3C is a side view cross-sectional conceptual diagram illustrating a machined workpiece prior to refinement of an initial electrode overlaid with a master workpiece.

A computing device may generate updated electrode model data based on the workpiece measurement data, as described in steps 208-218 below and the example computing device of FIG. 4. The computing device may receive the workpiece measurement data (208) and identify a set of dimensional differences between the workpiece measurement data and workpiece model data representative of a finished surface of a master workpiece (210). FIG. 3C is a side view cross-sectional conceptual diagram illustrating machined workpiece 312 prior to refinement of an initial electrode overlaid with master workpiece 302. For example, FIG. 3C may illustrate differences between the workpiece measurement data representing machined workpiece 312 and the workpiece model data representing master workpiece 302. As illustrated in FIG. 3C, machined surface 314 of machined workpiece 312 deviates from finished surface 306 of master workpiece 302. The set of dimensional differences between the workpiece measurement data of machined workpiece 312 and the workpiece model data of master workpiece 302 may represent a parameterization of various data points between the workpiece measurement data and the workpiece model data.

Figure 3D:
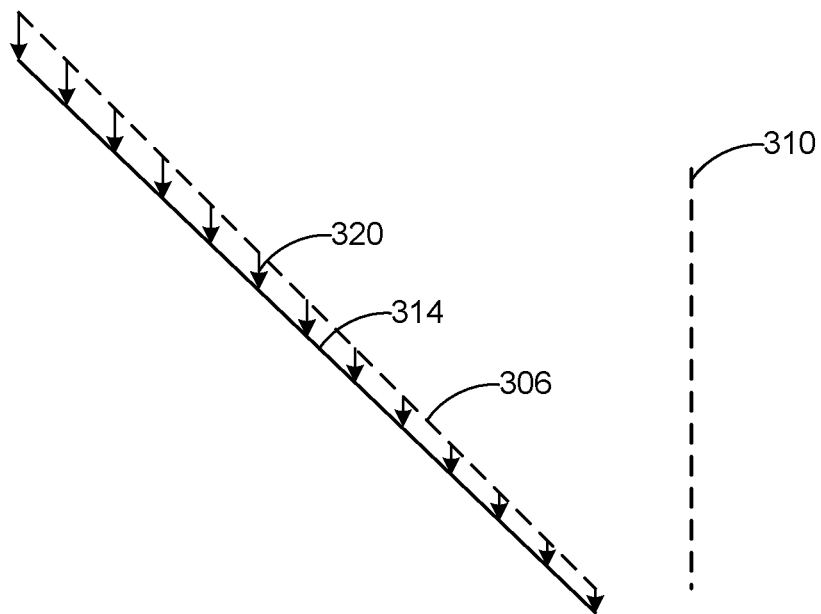
FIG. 3D is a side view cross-sectional conceptual diagram illustrating a portion of the machined surface of the machined workpiece and the finished surface of the master workpiece of FIG. 3C.

FIG. 3D is a side view cross-sectional conceptual diagram illustrating a portion of the machined surface of the machined workpiece and the finished surface of the master workpiece of FIG. 3C. As will be described further in FIG. 4 below, the workpiece measurement data may include a point cloud corresponding to measured points on machined workpiece 312, while the workpiece model data may include a point cloud corresponding to model points on master workpiece 302, such as in a CAD program. Each point cloud may represent a plurality of data points representing a corresponding machined surface 314 or finished surface 306. The set of dimensional differences may include a plurality of vectors 320 representing a distance between corresponding data points of the first point cloud and the second point cloud. The plurality of vectors 320 may be selected to adequately represent and characterize the differences between machined surface 314 and finished surface 306, and may be selected in such a way that these differences may be translated to adjustments to the electrode model data. In some examples, the plurality of vectors 320 may be defined with respect to an axis of movement of the electrode, such as z-axis 310. Each of the plurality of vectors 320 includes a difference in z-axis 310 between a data point of the first point cloud and a corresponding data point of the second point cloud. For example, each of the plurality of vectors 320 may include a magnitude along z-axis 310 and a direction along z-axis 310. In some examples, the plurality of vectors 320 may be represented as a data table or other data structure that includes a direction and magnitude of a vector 320 and a location of the corresponding vector 230 within a coordinate system, such that the plurality of vectors 320 defined by the workpiece measurement data and workpiece model data may be related to electrode model data.

The computing device may evaluate whether the set of dimensional differences is less than a set of tolerances for master workpiece 302 (212). For example, master workpiece 302 may be associated with one or more manufacturing tolerances for a shape of finished surface 306. If the set of dimensional differences produced by the current electrode, such as initial electrode 300, are within the set of tolerances for master workpiece 302 ("YES"), the electrode model data, such as the initial electrode model data, may be output as finished electrode model data for use in fabricating an electrode (218).

Figure 3E:
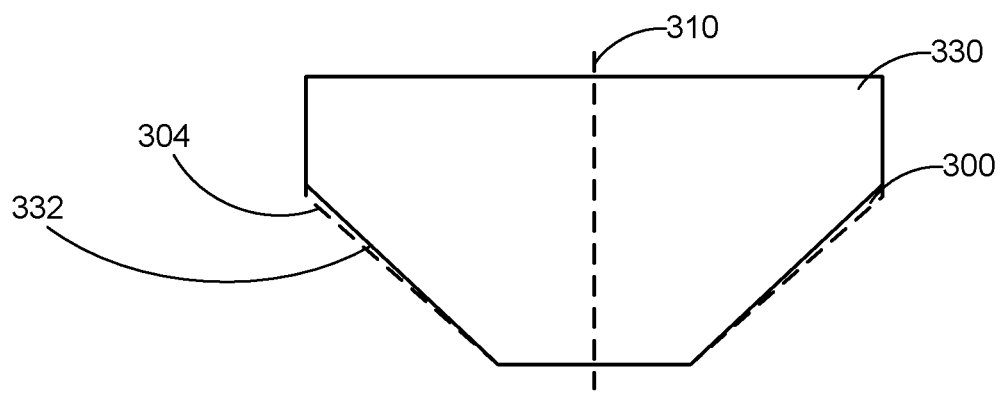
FIG. 3E is a side view cross-sectional conceptual diagram illustrating an initial electrode overlaid with a refined electrode.

If the set of dimensional differences produced by the current electrode, such as initial electrode 300, are not within the set of tolerances for master workpiece 302 ("NO"), the computing device may update, based on the set of dimensional differences, the initial electrode model data representative of working surface 304 of initial electrode 300 (214). FIG. 3E is a side view cross-sectional conceptual diagram illustrating initial electrode 300 overlaid with a refined electrode 330. Refined electrode 330 may represent an electrode that corresponds to updated electrode model data based on the set of dimensional differences, including a refined working surface 332. The initial electrode model data may include a plurality of data points defining a surface geometry, such as a point cloud, for initial electrode 300. To update the electrode model data, the computing device may adjust the plurality of data points by the plurality of vectors. At least some of the data points may be aligned to the plurality of vectors 320 within a same coordinate system, such that differences between machined surface 314 and finished surface 306 may be used to adjust working surface 304. For example, a data point of the electrode point cloud corresponding to a data point in the machined workpiece point cloud may be adjusted in an opposite direction and equal magnitude as the vector corresponding to the data point of the machined workpiece point cloud.

In some examples, the computing device may receive initial electrode measurement data representative of working surface 304 of initial electrode 300, and updating the electrode model data is further based on one or more differences between the initial electrode measurement data and the initial electrode model data. As explained above, such comparison between the initial electrode model and the measured initial electrode shape may account for sources of fabrication error in initial electrode 300.

The computing device may output the updated electrode model data (214). In examples in which only a single iteration is desired, the computing device may output the updated electrode model data as finished electrode model data for fabricating electrodes (218). However, in examples in which further evaluation or refinement of initial electrode is desired, the computing device may further iterate the updated electrode model data based on generated workpiece measurement data until a workpiece produced by the particular iteration of the electrode meets the dimensional tolerances for master workpiece 302.

To further refine initial electrode 300, the computing device may output the updated electrode model data to the electrode fabrication system. The electrode fabrication system may machine refined electrode 330 based on the updated electrode model data (202). The pECM system may machine a second machined workpiece using refined working surface 332 of refined electrode 330 (204). The coordinate measurement system may generate second workpiece measurement data representative of a machined surface of the second machined workpiece (206).

The computing device may further evaluate if the machined surface of the second machined workpiece is within specification and, if not, generating updated electrode model data based on the second workpiece measurement data. The computing device may receive the second workpiece measurement data (208), identify a second set of dimensional differences between the second workpiece measurement data and the workpiece model data of master workpiece 302 (210), and evaluate whether the second set of dimensional differences are within tolerance (212). If the second set of dimensional differences are within tolerance, the computing device may output the updated electrode model data as the finished electrode model data (218). If the second set of dimensional differences are not within tolerance, the computing device may update, based on the second set of dimensional differences, the previously updated electrode model data representative of working surface 332 of refined electrode 330 (214) and output the newly updated electrode model data (216). The computing device may repeat steps 208-218 until any dimensional differences between the current iteration of the electrode are within tolerance, or another metric for dimensional accuracy is met (e.g., a desired number of total iterations).

Figure 4:
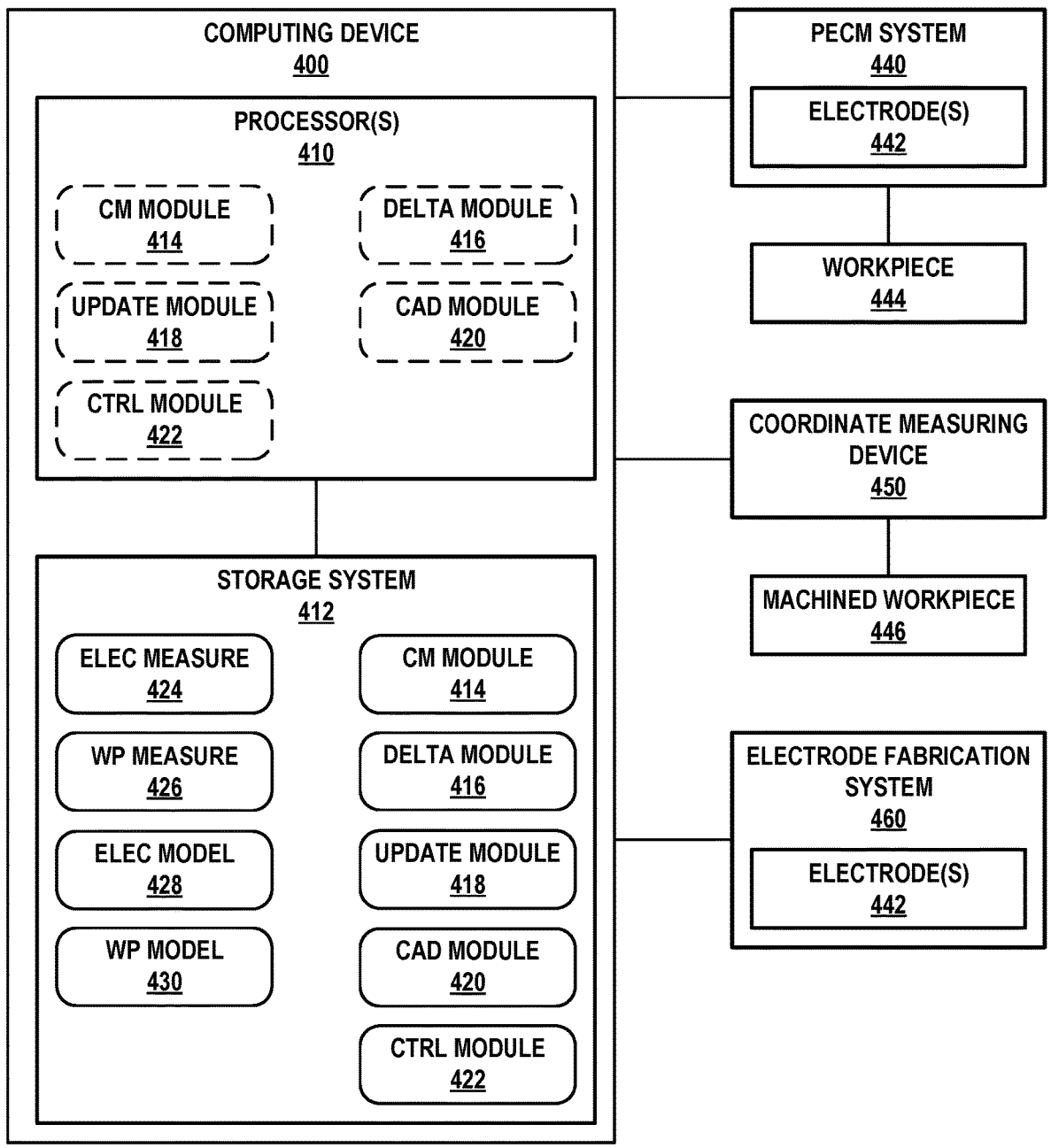
FIG. 4 is a diagram illustrating an example computing device configured to perform various aspects of the electrode refinement techniques described in this disclosure.

FIG. 4 is a diagram illustrating an example computing device configured to perform various aspects of the electrode refinement techniques described in this disclosure, such as at least portions of the method of FIG. 2. As shown in the example of FIG. 4, computing device 400 may include one or more processors 410 and a storage system 412.

One or more processors 410 may implement functionality and/or execute instructions associated with computing device 400. Examples of processors 410 include application processors, microcontrollers, central processing units (CPUs), field programmable gate arrays (FPGAs), application specific integrated circuits (ASICs), graphics processing units (GPUs), display controllers, auxiliary processors, one or more sensor hubs, and any other hardware configure to function as a processor, a processing unit, or a processing device.

Modules 414-422 may be operable (or, in other words, executed) by processors 410 to perform various actions, operations, or functions of computing device 400. That is, modules 414-422 may form executable bytecode, which when executed, cause processors 410 to perform specific operations (and thereby causing computing device 400 to become a specific-purpose computer by which to operate) in accordance with various aspects of the techniques described herein. For example, processors 410 of computing device 400 may retrieve and execute instructions stored by storage system 412 that cause processors 410 to perform the operations described herein that are attributed to modules 414-422. The instructions, when executed by processors 410, may cause computing device 400 to store information within storage system 412.

Storage system 412 within computing device 400 may store information for processing during operation of computing device 400 (e.g., computing device 400 may store data accessed by modules 414-422 during execution) and information for retrieval during operation of computing device 400. In some examples, storage system 412 is a temporary memory, meaning that a primary purpose of storage system 412 is not long-term storage. Storage system 412 on computing device 400 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage system 412 may, in some examples, also include one or more computer-readable storage media. Storage system 412 may include one or more non-transitory computer-readable storage mediums, which may be configured to store larger amounts of information than typically stored by volatile memory. Storage system 412 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage system 412 may store program instructions and/or information (e.g., data) associated with modules 414-422.

Storage system 412 may include a memory configured to store data or other information associated with modules 414-422. In the example of FIG. 4, storage system 412 is configured to store electrode measurement data 424 ("ELEC MEASURE 424"), workpiece measurement data 426 ("WP MEASURE 426"), electrode model data 428 ("ELEC MODEL 428"), and workpiece model data 430 ("WP MODEL 430").

Electrode measurement data 424 and workpiece measurement data 426 may include measurement data generated from a coordinate measuring device for a respective electrode and workpiece. The measurement data may include a point cloud within a coordinate system that includes a plurality of data points representing a three-dimensional surface of an object, such as an electrode or workpiece. Electrode measurement data 424 may include measurement data for an electrode used in a pECM system, such as initial electrode 300 of FIG. 3A or refined electrode 330 of FIG. 3E, and define a working surface of the electrode. Workpiece measurement data 426 may include measurement data for a workpiece machined by an electrode of a pECM system, such as machined workpiece 312 of FIG. 3B, and define a machined surface of the workpiece.

Electrode model data 428 and workpiece model data 430 may include model data generated from a computing device for a respective electrode or workpiece. The model data may represent a point cloud, mesh, wireframe, or other visual structure within a coordinate system that includes a plurality of data points representing a three-dimensional surface of a model of an object, such as an electrode or workpiece. Electrode model data 428 may include model data used to fabricate an electrode for use in a pECM system. Workpiece model data 430 may include model data for a master workpiece for use as a reference for a workpiece machined by an electrode of a pECM system.

Processors 410 may be configured to execute a coordinate measuring (CM) module 414. Coordinate measuring module 414 may represent software executing by processors 410 that may facilitate receipt and pre-processing of measurement data received from a coordinate measuring device 450. Coordinate measuring device 450 may be configured to measurement data, such as workpiece measurement data 426 for a machined workpiece 446. Coordinate measuring module 414 may interface with coordinate measuring device 450 to obtain measurement data for machined workpiece 450, such as by causing coordinate measuring device 450 to obtain a scan of machined workpiece 446. Workpiece measurement data 426 may be representative of a machined surface of machined workpiece 446, in which machined workpiece 446 has been machined by a working surface of an initial electrode.

Processors 410 may be configured to execute a delta module 416. Delta module 416 may represent software executing by processors that may facilitate identification of a set of dimensional differences between workpiece measurement data 426 and workpiece model data 430 representative of a finished surface of a master workpiece. Delta module 416 may be configured to align coordinate systems of workpiece measurement data 426 and workpiece model data 430, such that various spatial representations of surfaces of machined workpiece 446 and the master workpiece may be compared. The set of dimensional differences between workpiece measurement data 426 of machined workpiece 446 and workpiece model data 430 of the master workpiece may represent a parameterization of various data points between workpiece measurement data 426 and workpiece model data 430.

Workpiece measurement data 426 may include a point cloud corresponding to measured points on machined workpiece 446. For example, the point cloud may include a plurality of data points that represent a three-dimensional contour of the machined surface of machined workpiece 446. Workpiece model data 430 may include a point cloud corresponding to model points on the master workpiece. For example, the point cloud may include a plurality of data points that represent a three-dimensional contour of the finished surface of a model of the master workpiece. The set of dimensional differences may include a plurality of vectors representing a distance between corresponding data points of the first point cloud of machined workpiece 446 and the second point cloud of the master workpiece.

Delta module 416 may be configured to select the plurality of vectors, automatically or based on user input, to adequately represent and characterize the differences between the machined surface of machined workpiece 446 and the finished surface of the master workpiece. For example, delta module 416 may select the data points in such a way that update module 418 may translate these differences to adjustments to electrode model data 428. In some examples, delta module 416 may define the plurality of vectors with respect to an axis of movement of electrode 442, such as a z-axis. Each of the plurality of vectors includes a difference in the z-axis between a data point of the first point cloud of machined workpiece 446 and a corresponding data point of the second point cloud of the master workpiece. For example, each of the plurality of vectors may include a magnitude along the z-axis, such as a distance, and a direction along z-axis, such as a distal or proximal direction. In some examples, the plurality of vectors may be represented as a data table or other data structure that includes a direction and magnitude of a vector and a location of the corresponding vector within a coordinate system, such that the plurality of vectors defined by workpiece measurement data 426 and workpiece model data 430 may be related to electrode model data 428. In some examples, delta module 416 may be configured to evaluate whether the set of dimensional differences is less than a set of tolerances for the master workpiece.

Processors 410 may be configured to execute an update module 418 and a CAD module 420. Update module 418 and CAD module 420 may represent software executing by processors that may facilitate updating electrode model data 428 based on a set of dimensional differences identified by delta module 416 and outputting electrode model data 428. For example, update module 418 may be configured to translate the set of dimensional differences into one or more alterations to a working surface of an electrode. Update module 418 may be configured to select a plurality of data points from electrode model data 428 that define a surface geometry, such as a point cloud, for electrode 442. To update electrode model data 428, update module 418 may be configured to adjust the plurality of data points by the plurality of vectors from delta module 416. Update module 418 may be configured to align a coordinate system of the plurality of vectors with a coordinate system of electrode model data 428, such that at least some of the data points selected from electrode model data 428 may align with the plurality of vectors, and the differences between the machined surface of machined workpiece 446 and the finished surface of the master workpiece may be used to adjust the working surface of electrode 442.

Update module 418 may be configured to determine one or more alterations to electrode model data 428 based on the plurality of vectors. In some instances, update module 418 may be configured to invert the plurality of vectors to refine a working surface of the model of the electrode. For example, a data point of a point cloud for an electrode defined by electrode model data 428 may correspond to a data point in the point cloud of machined workpiece 446, and update module 418 may adjust the data point of the point cloud of the electrode in an opposite direction and to an equal magnitude as the vector corresponding to the data point of the point cloud machined workpiece. In some examples, update module 418 may apply a further operation to determine a degree of alteration of electrode model data 428. In the example above, update module 418 may adjust the data point of the point cloud of the electrode in the opposite direction, but to a different magnitude as the vector corresponding to the data point of the point cloud of the machined workpiece. Such non-proportional adjustments may be at least partially determined by simulations, historical data, or operator experience.

In some examples, update module 418 may receive electrode measurement data 424 representative of electrode 442 and determine one or more differences between electrode measurement data 424 and electrode model data 428. Based on these differences, update module 418 may update electrode model data 428 to more account for sources of fabrication error in electrode 442.

CAD module 420 may be configured to receive the alterations to electrode model date 428 and update electrode model data 428 based on the alterations. For example, CAD module 420 may interface with update module 418 to receive the alterations to electrode model data 428 and modify electrode model data 428 to account for these alterations.

Processors 410 may be configured to execute a control (CTRL) module 422. Control module 422 may represent software executing by processors that may facilitate control of one or more external systems based on electrode model data 428 and/or workpiece model data 430. As one example, control module 422 may be configured to output electrode model data 428 to an electrode fabrication system 460 to cause electrode fabrication system 460 to fabricate an electrode 442 based on electrode mode data 428. For example, electrode 442 may include an initial electrode based on initial electrode model data or a refined electrode based on updated electrode model data. As another example, control module 422 may be configured to output workpiece model data 430 to a pECM system 440 to cause pECM system 440 to fabricate machined workpiece 446 based on workpiece model data 430 and using electrode 442.

Although not shown in the example of FIG. 4, computing device 400 may include additional hardware and/or software not shown in the example of FIG. 4. For example, computing device 400 may include display devices, network interface cards (NICs), interface components (e.g., keyboards, mice, etc.), and the like, as well as software, including operating systems (OSes) that present an application space in which various applications or other modules may execute separate from the OSes, and the like. Computing device 400 may be communicatively coupled to various external devices, such as pECM system 440, coordinate measuring device 450, and/or electrode fabrication system 460.

In this respect, various aspects of the techniques may enable the following examples.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method for defining a pulsed electrochemical machining (pECM) tool, comprising:
   receiving, by one or more processors, workpiece measurement data representative of a machined surface of a machined workpiece, wherein the machined workpiece has been machined by a working surface of an initial electrode, and wherein the workpiece measurement data comprises a first point cloud;
   identifying, by the one or more processors, a set of dimensional differences between the workpiece measurement data and workpiece model data representative of a finished surface of a master workpiece, wherein the workpiece model data comprises a second point cloud, and wherein the set of dimensional differences comprises a plurality of vectors representing a distance between corresponding data points of the first point cloud and the second point cloud;
   updating, by the one or more processors and based on the set of dimensional differences, initial electrode model data representative of the working surface of the initial electrode; and
   outputting, by the one or more processors, the updated electrode model data.

2. The method of claim 1,
   wherein the electrode model data comprises a plurality of data points, and
   wherein updating the initial electrode model data comprises adjusting the plurality of data points by the plurality of vectors.

3. The method of claim 2,
   wherein the initial electrode is configured to advance along a z-axis, and
   wherein each of the plurality of vectors comprises a difference in the z-axis between a data point of the first point cloud and a corresponding data point of the second point cloud.

4. The method of claim 3, wherein each of the plurality of vectors comprises a magnitude along the z-axis and a direction along the z-axis.

5. The method of claim 1, further comprising:
   receiving, by the one or more processors, second workpiece measurement data representative of a machined surface of a second machined workpiece, wherein the second machined workpiece has been machined by a working surface of a refined electrode based on the updated electrode model data;
   identifying, by the one or more processors, a second set of dimensional differences between the second workpiece measurement data and the workpiece model data;
   updating, by the one or more processors and based on the second set of dimensional differences, the previously updated electrode model data representative of the working surface of the refined electrode; and
   outputting, by the one or more processors, the newly updated electrode model data.

6. The method of claim 1, wherein the working surface of the initial electrode is offset from the finished surface of the master workpiece by a predetermined gap.

7. The method of claim 6, further comprising determining, by the one or more processors and based on the workpiece model data and the predetermined gap, the initial electrode model data.

8. The method of claim 1, further comprising receiving, by the one or more processors, initial electrode measurement data representative of the working surface of the initial electrode.

9. The method of claim 8, wherein the updated electrode model data is further determined based on one or more differences between the initial electrode measurement data and the initial electrode model data.

10. A device for defining a pulsed electrochemical machining (pECM) tool, comprising:
    a memory configured to store:
       workpiece model data representative of a finished surface of a master workpiece; and
       initial electrode model data representative of a working surface of an initial electrode; and
    one or more processors configured to:
       receive workpiece measurement data representative of a machined surface of a machined workpiece, wherein the machined workpiece has been machined by the working surface of the initial electrode, and wherein the workpiece measurement data comprises a first point cloud;
       identify a set of dimensional differences between the workpiece measurement data and the workpiece model data, wherein the workpiece model data comprises a second point cloud, and wherein the set of dimensional differences comprises a plurality of vectors representing a distance between corresponding data points of the first point cloud and the second point cloud;
       update, based on the set of dimensional differences, the initial electrode model data; and
       output the updated electrode model data.

11. The device of claim 10,
    wherein the initial electrode model data comprises a plurality of data points, and
    wherein, to update the initial electrode model data, the one or more processors are configured to adjust the plurality of data points by the plurality of vectors.

12. The device of claim 11,
    wherein the initial electrode is configured to advance along a z-axis, and
    wherein each of the plurality of vectors comprises a difference in the z-axis between a data point of the first point cloud and a corresponding data point of the second point cloud.

13. The device of claim 12, wherein each of the plurality of vectors comprises a magnitude along the z-axis and a direction along the z-axis.

14. The device of claim 10, wherein the one or more processors are configured to:
receive second workpiece measurement data representative of a machined surface of a second machined workpiece, wherein the second machined workpiece has been machined by a working surface of a refined electrode based on the updated electrode model data;
identify a second set of dimensional differences between the second workpiece measurement data and the workpiece model data;
update, based on the second set of dimensional differences, the previously updated electrode model data representative of the working surface of the refined electrode; and
output the newly updated electrode model data.

15. The device of claim 10,
wherein the working surface of the initial electrode is offset from the finished surface of the master workpiece by a predetermined gap, and
wherein the one or more processors are configured to determine, based on the workpiece model data and the predetermined gap, the initial electrode model data.

16. The device of claim 10, wherein the one or more processors are configured to receive initial electrode measurement data representative of the working surface of the initial electrode.

17. The device of claim 16, wherein the one or more processors are configured to determine the updated electrode model data based on one or more differences between the initial electrode measurement data and the initial electrode model data.

18. A system for refining a pulsed electrochemical machining (pECM) tool, comprising:
a coordinate measurement device configured to generate workpiece measurement data representative of a machined workpiece; and
a computing device comprising one or more processors configured to:
receive the workpiece measurement data, wherein the machined workpiece has been machined by a working surface of an initial electrode, and wherein the workpiece measurement data comprises a first point cloud;
identify a set of dimensional differences between the workpiece measurement data and workpiece model data representative of a finished surface of a master workpiece, wherein the workpiece model data comprises a second point cloud, and wherein the set of dimensional differences comprises a plurality of vectors representing a distance between corresponding data points of the first point cloud and the second point cloud;
update, based on the set of dimensional differences, initial electrode model data representative of the working surface of the initial electrode; and
output the updated electrode model data.

* * * * *